United States Patent [19]

Latzina et al.

[11] 4,165,203

[45] Aug. 21, 1979

[54] PRESSURIZED MEDIUM POWERED DEVICE

[75] Inventors: Kurt Latzina, Waldenbuch; Hans Martin, Leinfelden; Richard Wolf, Stuttgart, all of Fed. Rep. of Germany

[73] Assignee: Robert Bosch GmbH, Stuttgart, Fed. Rep. of Germany

[21] Appl. No.: 728,399

[22] Filed: Sep. 30, 1976

[30] Foreign Application Priority Data

Oct. 29, 1975 [DE] Fed. Rep. of Germany ... 7534297[U]

[51] Int. Cl.$^2$ ............................................... F03B 13/04
[52] U.S. Cl. ....................................... 415/113; 418/503; 285/136; 277/173; 277/216
[58] Field of Search ............... 415/113, 503; 418/270, 418/175, 177, 186; 285/135, 98, 190; 277/173, 174, 177, 216, DIG. 6

[56] References Cited

U.S. PATENT DOCUMENTS

| | | | |
|---|---|---|---|
| 1,497,770 | 6/1924 | Coleman et al. | 277/176 |
| 2,600,321 | 6/1952 | Pyle et al. | 277/DIG. 6 |
| 2,644,804 | 7/1953 | Rubin | 277/DIG. 6 |
| 2,662,785 | 12/1953 | Fawick | 285/136 |
| 2,690,360 | 9/1954 | Young | 277/177 |
| 2,698,664 | 1/1955 | Freeman | 285/190 |
| 2,759,777 | 8/1956 | Anderson | 277/177 |
| 2,781,134 | 2/1957 | Weir et al. | 285/136 |
| 2,877,070 | 3/1959 | Lee | 277/173 |
| 2,877,071 | 3/1959 | Arnot | 277/176 |
| 2,923,306 | 2/1960 | Mitchell | 415/503 |
| 3,351,360 | 11/1967 | Faccou | 285/136 |
| 3,391,609 | 7/1968 | Schmitz | 418/177 |
| 3,462,176 | 8/1969 | Goodrum | 285/136 |
| 3,674,385 | 7/1972 | Rohde et al. | 418/177 |
| 3,748,062 | 7/1973 | Wilcox | 418/177 |
| 3,905,450 | 9/1975 | Persson | 277/177 |
| 3,988,076 | 10/1976 | Wolf et al. | 418/270 |
| 3,999,894 | 12/1976 | Nakayama | 277/177 |

FOREIGN PATENT DOCUMENTS

| | | | |
|---|---|---|---|
| 1603013 | 4/1971 | France | 277/DIG. 6 |
| 759098 | 10/1956 | United Kingdom | 285/136 |

*Primary Examiner*—Carlton R. Croyle
*Assistant Examiner*—Richard E. Gluck
*Attorney, Agent, or Firm*—Michael J. Striker

[57] ABSTRACT

A pressurized medium powered device has a motor of the external rotor type, both the stator and the rotor of the motor having registering channels which communicate with one another across an interstice. At least one annular groove is provided in at least one of the rotor and stator components of the motor at the interstice, and at least one annular sealing element, such as an O-ring or a slotted ring of rectangular cross-sectional configuration is received in the annular groove with axial and radial play and is pressed into sealing contact with the components, and into sliding contact with at least one of the components, by the pressure of the pessurized medium. An annular depression may be formed in the other component in registry with the annular groove, and the sealing element may be partly received in such depression. At least one of the surfaces which bound the interstice is very smooth, which can be obtained by fine machining, surface contacting, or providing a layer of synthetic plastic material on such surface.

20 Claims, 15 Drawing Figures

PRESSURIZED MEDIUM POWERED DEVICE

BACKGROUND OF THE INVENTION

The present invention relates to a pressurized fluid driven device in general, and more particularly to such a device having a motor of the external rotor type.

There are already known various types of devices which are powered by a pressurized medium, such as compressed air or other gaseous medium, or by a hydraulic fluid. Among these, there are also known various devices which utilize, as a drive, a motor of the external rotor type, that is, a motor the rotor of which circumferentially surrounds and rotates about a stator. In the devices of this type, it is necessary to supply the pressurized medium into the rotor in order to drive the same into rotation, this being accomplished by providing channels in a stationary component of the device, which communicate with corresponding channels provided in the rotor across an interstice which is present between the stationary component and a rotating component of the motor.

One of the conventional devices of this type is a hand-held power tool, such as a compressed air power impacting tool which can be used for threading screws or nuts and for tightening the same. This conventional power tool utilizes a rotary motor of the vane type having an external rotor. The compressed air is delivered into the external rotor of this motor, which can rotate only in one direction, through an internal stator via an axial channel and via radial bores communicating with the axial channel, the radial bores communicating, across an interstice existing between the external rotor and the internal stator, with an annular groove provided in the external rotor. The compressed air passes through channels provided in the rotor, driving the rotor into rotation, and the spent air is directly discharged from the external rotor through bores which are provided in the power tool.

In this known power tool, the cylindrical interstice between the external rotor and the internal stator is made with as small a width as possible, and the axial length of the interstice is made as large as feasible, so as to minimize the leakage of the compressed air through the interstice, without performing useful work. The relatively small width and relatively large length of the interstice is the only means for preventing the compressed air from escaping through the interstice. Despite these expedients, considerable losses of the compressed air are encountered in this prior-art power tool.

The above-described problems encountered in the non-reversible power tool are even compounded when it is desired to so construct the power tool as to be reversible in its direction of rotation. Such reversible power tools are very useful and could be very compact and simple in construction when using a reversible motor of the external rotor type which is driven by compressed air or the like. However, under these circumstances, additional channels, radial bores and annular grooves have to be provided in the stationary and rotating components of the motor for rotating the rotor in a direction opposite to that in which it rotates when the above-discussed channels, bores and grooves are used. Under these conditions, it is not only necessary to seal the interstice between the first-mentioned annular groove and the exterior of the motor, but also to seal the interstice between the additional annular groove and the exterior of the motor and, in addition thereto, also the interstice between the two annular grooves. It will be appreciated that an attempt to minimize the escape of the compressed air through the interstice by making the same relatively long in the axial direction is bound to fail, at least for use in hand-held power tools, inasmuch as the axial dimensions of the entire power tool would then be excessive, and so would its weight, contrary to what is expected of hand-held power tools.

SUMMARY OF THE INVENTION

Accordingly, it is a general object of the present invention to avoid the disadvantages of the prior art.

More particularly, it is an object of the present invention to provide a pressurized medium powered device which is simple in construction and reliable in operation.

It is still another object of the present invention to seal the interstice between a stator and a rotor of the device of this type in a simple, inexpensive and energy-saving manner.

A concomitant object of the present invention is to so construct a motor which is driven by a pressurized medium that losses of the pressurized medium are minimized if not eliminated.

In pursuance of these objects and others which will become apparent hereafter, one feature of the present invention resides, in a pressurized medium powered device, briefly stated, in a combination comprising at least two components one of which is rotatable relative to the other, said components being adjacent one another and defining with each other an interstice, each of said components having at least one respective channel for passage of a pressurized medium therethrough, said channels of said components communicating with one another across said interstice, and means for sealing said interstice, including at least one annular sealing element which is pressed into sealing contact with said components by the pressurized medium. Preferably, the sealing element is elastic, and is in sliding contact with at least one of said components when pressed against the same by the pressurized medium.

As a result of the fact that the elastic annular sealing element acts as a sliding ring seal, as opposed to conventional sliding ring seals which utilize special metallic or other sliding rings, there is achieved a minimization of the weight of the seal and also of the space assumed by the same. As a result of the fact that the elastic annular sealing element is pressed against the relatively movable components by the pressure of the pressurized medium, there is achieved a reduction in the space assumed by the seal and in the friction between the latter and the components, with concomitant energy savings, as compared to conventional sealing lip type seals which usually utilize a pre-tension exerted by a pre-tensioned spring.

In a currently preferred embodiment of the present invention, the interstice has a width of at least 0.1 millimeters. At least one of the above-mentioned components is an annular groove at the interstice in which the sealing element is received with radial and axial play. The above-mentioned one component is an external rotor of a pressurized fluid driven motor, the rotor adjoining the other component or stator of the motor at the interstice, the latter being of a cylindrical configuration. In this embodiment, which is currently preferred, at least a respective one of the components has an annular recess which directly communicates with the above-mentioned channel in the same component and also communicates with the channel in the respective other component across the interstice. The annular recess may preferably be of a substantially rectangular configuration.

To advantage, the direction of rotation of the one component or rotor is reversible, and the above-mentioned channels of the components are used during the rotation of the one component in one direction. Additional channels similar to the above-discussed channels and also provided in the components are used during the rotation of the rotor in the opposite direction. Then, the sealing means includes at least one additional sealing element of the same type as discussed above which is also arranged at the interstice. Such additional sealing element may be arranged intermediate the channels and the additional channels.

When the rotor is to be reversible as to its direction of rotation, it is even more advantageous if three rather than two sealing elements are provided, one of such sealing elements being arranged at the interstice intermediate the channels and the additional channels, and the remaining two sealing elements being each arranged to one side of the above-mentioned channels or additional channels.

The annular sealing element may be an O-ring, and then one of the components may have an annular groove at the interstice in which the O-ring is received with axial and radial play, and the other component may be formed with an annular depression which partly receives the O-ring, in a region facing the annular groove. The O-ring has a thickness, and the annular depression has a depth which amounts to up to one fourth of the thickness of the O-ring.

According to a further aspect of the present invention, the annular sealing element may be of a substantially rectangular cross-sectional configuration. The sealing element of this type may be slotted, such as, for instance, along a plane extending in substantially radial direction of the sealing element. The sealing element may include two annular sealing members of similar configurations, preferably obtained by splitting the sealing element into two parts, one of the parts being angularly displaced with respect to the other part about their common axis and then connected thereto. Alternatively, the sealing element may include at least one slot which extends substantially parallel to the outer periphery of the sealing element. As a further possibility, the sealing element may include at least one slot which is inclined with respect to the outer periphery of the sealing element.

A further concept of the present invention resides in making at least one of the surfaces which bound the interstice as smooth as possible, preferably the surface of that component which does not have the above-mentioned annular groove therein. This can be achieved by fine-machining the surface, by compacting the material of such component at such surface, or by providing a layer of synthetic plastic material at such surface.

The novel features which are considered as characteristic for the invention are set forth in particular in the appended claims. The invention itself, however, both as to its construction and its method of operation, together with additional objects and advantages therof, will be best understood from the following description of specific embodiments when read in connection with the accompanying drawings.

DETAILED DISCUSSION OF THE PREFERRED EMBODIMENTS

Figure 1:
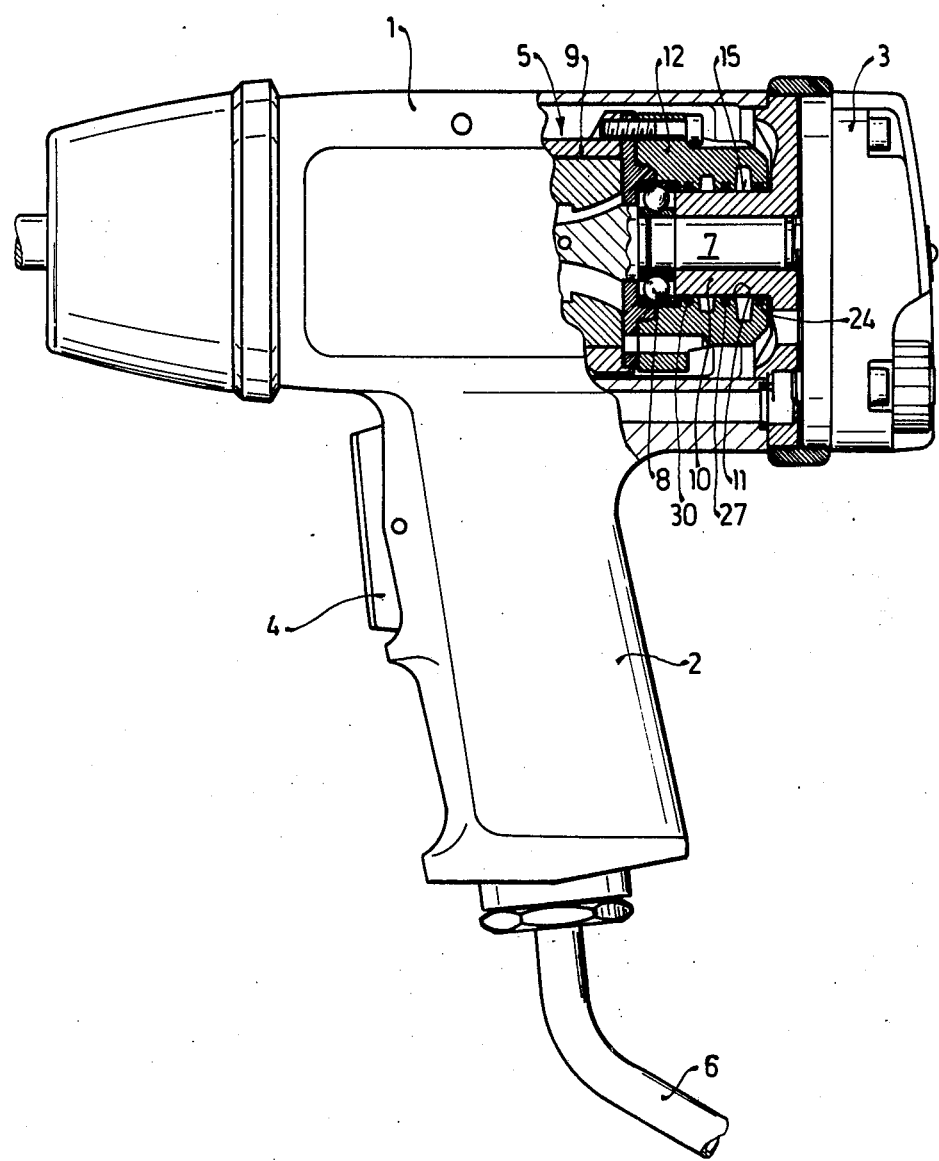
FIG. 1 is a partly sectioned view of the present invention as embodied in, as an example, a compressed air powered impact screw driving power tool with a rotary motor of the vane type and having an external rotor.

Referring now to the drawings, and first to FIG. 1 thereof, it is to be understood that, in the following discussion, the expression "forward" is meant to designate the direction toward the tool element proper, that is, toward left in FIG. 1, while "rearward" designates the opposite direction.

The power tool, such as the compressed air powered impact screw-driving power tool illustrated in FIG. 1, has a housing 1 with a handgrip 2 thereon, and also with a control housing 3 which is connected to the housing 1 at the rear end thereof. A switch 4 is mounted in the handgrip 2, the switch 4 controlling the admission of compressed air, to a motor designated in toto with the reference numeral 5 and supported in the housing 1, from a compressed air conduit 6.

An internal stator 7 is connected, for instance by a threaded connection, to the control housing 3, and an external rotor 9 is mounted on the internal stator 7 for rotation relative thereto by means of a ball bearing 8. An air guide element 10 is arranged between the ball bearing 8 and the control housing 3 and surrounds the stator 7. An air guide drum 12 is connected for instance, threadingly connected, with the external rotor 9 so as to surround the air guide element 10 bounding an interstice 11 therewith.

Figure 2:
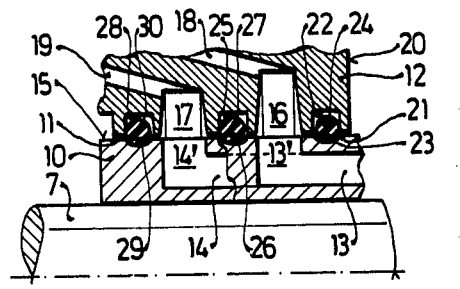
FIG. 2 is a detail of FIG. 1 of a first embodiment.

Air channels 13, 14 lead from the control housing 3 into the air guide element 10. Within the latter, the air channels 13, 14 end at respective junctions thereof with radial bores 13′, 14′, the latter opening on a cylindrical outer surface 15 of the air guide element 10, as particularly seen in FIG. 2.

A first annular recess 16 is provided in the air guide drum 12 which surrounds the air guide element 10, in alignment with the radial bore 13, while a second annular recess 17 is similarly associated with the radial bore 14'. In turn, the annular recesses 16 and 17 are respectively connected, via a first bore 18 and a second bore 19 in the air guide drum 12 with the interior of the external rotor 9 of the motor 5.

The air guide drum 12 has a rearward limiting plane 20 which extends normal to the axis of rotation of the drum 12. The air guide drum 12 has a cylindrical inner limiting surface 21, and a first annular groove 22 of an approximately rectangular cross-section is formed at the limiting surface 21 of the air guide drum 12 between the limiting plane 20 and the annular recess 16. In registry with, that is, opposite to the first annular groove 22, the air guide element 10 is formed with a first annular depression 23, the surface of which, taken in cross-section, is represented by a circular arc. A first O-ring 24 is accommodated, in a tension-less manner, in the first annular depression 23. The length of the chord of the circular arc which forms the surface of the annular depression 23 amounts to up to one fourth of the thickness of the O-ring 24.

In a similar manner, a second annular groove 25 aligned with an opposite second annular depression 26 in which a second annular O-ring 27 is accommodated, are arranged between the two annular recesses 16 and 17. Finally, also in a similar manner, a third annular groove with an oppositely arranged third annular depression 29 and a third O-ring 30 accommodated therein are provided forwardly of the second annular recess 17, that is, between the latter and the ball bearing 8.

The above-mentioned O-rings or any similar rings capable of performing a similar function, are received in the annular grooves 22, 25, 28 with an axial and radial play, and the gap or interstice 11 between the air guide drum 12 and the air guide element 10 is not as small as possible, as was customary prior to the present invention, but has a width of 0.1 millimeters or even somewhat greater.

The sealing of the channels or conduits which communicate with one another across the gap or interstice 11, and which are respectively provided in the stationary air guide element 10, and in the rotating air guide drum 12, that is, the sealing of the bores 13', 14' and of the annular recesses 16 and 17 relative to the exterior of the motor 5, performs the following function: Say, for instance, compressed air at an elevated pressure is to enter through the channel 13, and the spent air is to leave the motor 5 through the annular recess 17. When the switch 4 is actuated to admit compressed air from the conduit 6 into the motor 5, the pressure wave which gets into the interstice 11 from the radial bore 13' presses the O-rings 24 and 27 away from the annular recess 16 and against the outer walls of the annular grooves 22 and 25. The pressure of the compressed air which continues to axially and radially act at the O-rings 24 and 27 holds the latter in abutment against the outer wall of the annular grooves 22 and 25 provided in the air guide drum 12, and also in abutment with the annular depressions 23 and 26 provided in the air guide element 10, so that the O-rings seal the interstice 11 by such abutment. A similar situation exists at the third O-ring 30, inasmuch as the pressure of the expanded air present in the annular recess 17 and flowing out of the same is, in most circumstances, higher than the pressure within the ball bearing 8, which, in turn, is in connection, via the internal stator 7 and through leakage gaps in the control housing 3, with the exterior of the housing 1 and thus at the atmospheric pressure. However, when the ball bearing 8 is sufficiently sealed with respect to the exterior, the third-mentioned annular O-ring 30 can be dispensed with.

On the other hand, when the compressed air is admitted, instead of through the channel 13, through the channel 14 and thus into the annular recess 17, and the annular recess 16 and the channel 13 are used for discharging the spent air, the pressure conditions are reversed and, as a result of that, only the O-ring 27 which is arranged between the annular recesses 16 and 17 is moved by the pressure of the compressed air in the opposite direction from what has been described above, and abuts against the opposite, that is, rearward, wall of the annular groove 25 accommodating the same, thereby again sealing the interstice 11, together with the O-rings 24 and 30 which remain in their positions.

Figure 3:
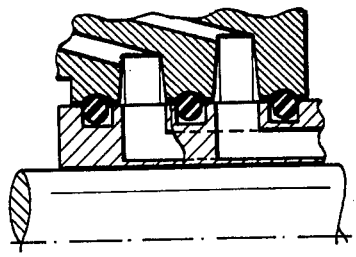
FIG. 3 is a view similar to FIG. 2 but of a second embodiment.

A second embodiment is illustrated in FIG. 3. In this embodiment, the annular grooves 22, 25 and 28 are provided in the air guide element 10 of the inner stator 7, and the annular depressions 23, 26 and 29 are provided in the air guide drum 12 of the external rotor 9 of the motor 5. Despite the difference in construction, the function of this embodiment is the same as that described above in connection with FIGS. 1 and 2.

Figure 4:
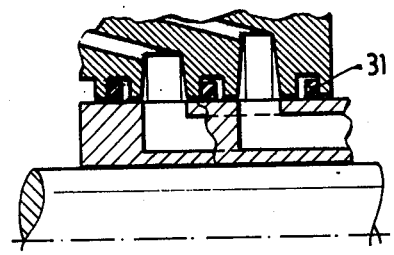
FIG. 4 is a view similar to FIG. 2 of a third embodiment.

A further embodiment of the present invention is illustrated in FIG. 4, in which the sealing effect is obtained not by means of O-rings or the like, but rather by means of sealing rings 31 having a rectangular cross-section. These sealing rings 31 can be circumferentially complete; if such is the case, that is, when the rings are uninterrupted, and a performance like that of the above-discussed O-rings is desired, the sealing rings 31 are preferably made of an elastic or easily deformable material.

Figure 5:
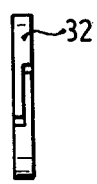
FIG. 5 is a side elevational view of a sealing element having a rectangular cross-section and slotted parallel to its end face.
Figure 6:
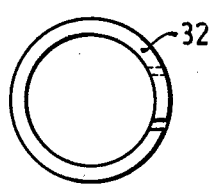
FIG. 6 is a front elevational view of the sealing element of FIG. 5.
Figure 7:
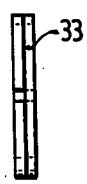
FIG. 7 is a side elevational view of a sealing element with a rectangular cross-section and divided parallel to its end face.
Figure 8:
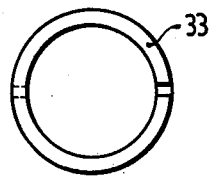
FIG. 8 is a front elevational view of the sealing element of FIG. 7.
Figure 9:
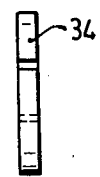
FIG. 9 is a side elevational view of a sealing element with a rectangular cross-section and slotted parallel to its circumference.
Figure 10:
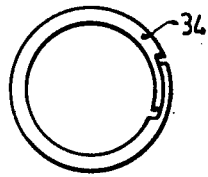
FIG. 10 is a front elelvational view of the sealing element of FIG. 9.
Figure 11:
FIG. 11 is a side elevational of a sealing element with a rectangular cross-section which is slotted at an angle to the outer circumference.
Figure 12:
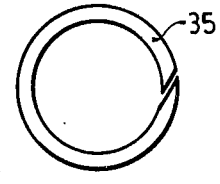
FIG. 12 is a front elevational view of the sealing element of FIG. 11.

However, the sealing rings can also be slotted. One possibility of how to construct the sealing rings is illustrated in FIG. 5, that is, the sealing rings designated with the reference numeral 32 may each be provided with a slot which extends parallel to the end faces of the sealing ring 32. However, as illustrated in FIGS. 7 and 8, a sealing ring 33 can also be fully divided in a plane parallel to the end faces thereof and the ring halves obtained in this manner can be rotated or angularly displaced with respect to one another about their common axis such as, for instance, by 180°, and such halves can be then connected with one another again. However, a sealing element 34 can also be slotted approximately parallel to its outer circumferential surface, as illustrated in FIGS. 9 and 10. Finally, a sealing element or ring 35 of rectangular cross-section may be slotted in the manner illustrated in FIGS. 11 and 12, that is at an angle to the outer circumferential surface of the sealing element 35.

Figure 2A:
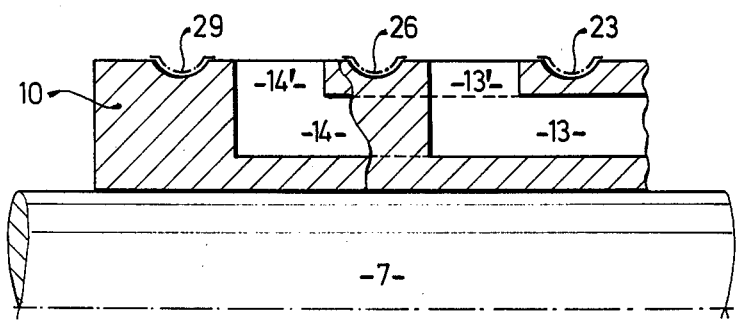
FIGS. 2a, 3a and 4a respectively illustrate the embodiment of FIGS. 2, 3 and 4 with smooth surfaces (shown by dot-dash lines) against which a sealing element can be pressed.
Figure 3A:
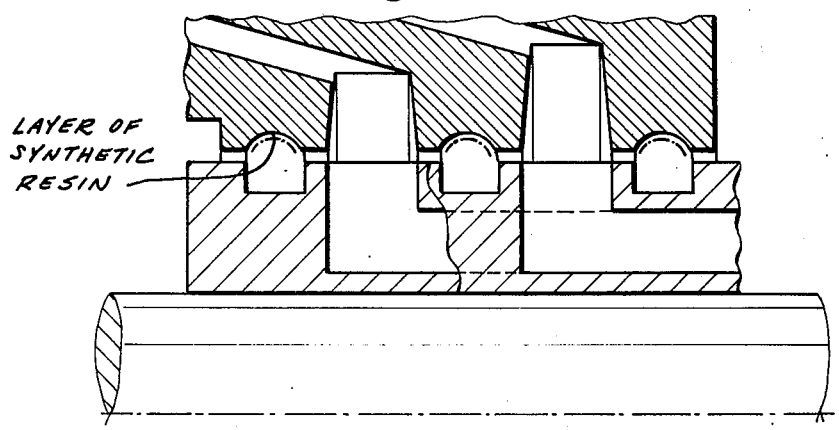
Figure 4A:
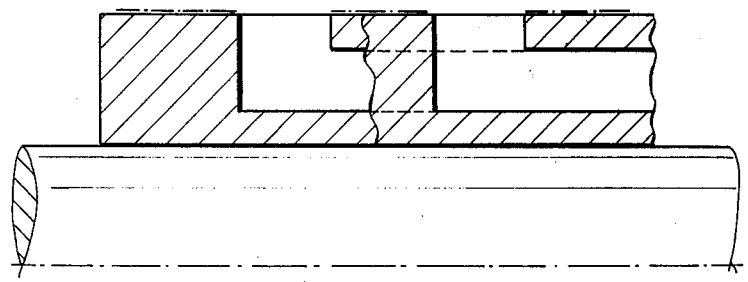

While the annular grooves 22, 25 and 28 which receive the sealing elements 24, 27 and 30 could have a conventional, finely-machined surface, it is advantageous when the surface of the cooperating components, against which the sealing elements 24, 27 and 30 are radially pressed, is smooth (the smooth surface being illustrated by the dot-dash lines of FIGS. 2a, 3a and 4a) to the greatest possible degree, which may be obtained by very fine machining, by condensing or compacting the material immediately underneath the respective surface, such as by rolling, by providing a layer of synthetic plastic material having an especially low frictional coefficient on such surface, and in any other known and conventional ways. Also, the use of known lubricants such as, for instance molybdenum disulfide (MoS$_2$) is advantageous.

The use of the O-rings or similar rings as sealing rings has the advantage that the resulting or existing surface pressures are increased by a line contact which leads, when synthetic plastic material abutment is used, to smoothing of the opposite component and, when the proper synthetic plastic material is used, the abutment made of such synthetic plastic material plastically deforms so as to conform to the sealing rings. When the sealing elements of rectangular cross-section are used, then the part which is not formed with the grooves can even be flat, that is, it can be formed without the annular depressions which are used for and desirable in connection with the O-rings, as a result of which any possible axial displacement of the air guide drum 12 relative to the air guide element 10 is without any influence on the quality of the sealing. Such an axial displacement may be desirable under some circumstances, so that this latter is a very important consideration.

It will be understood that each of the elements described above, or two or more together, may also find a useful application in other types of constructions differing from the types described above.

While the invention has been illustrated and described as embodied in a sealing arrangement for use in power tools, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A motor driven by pressurized fluid, the motor comprising an external rotor; at least two components including a first component connected to said external rotor for joint rotation therewith about an axis and relative to the second component, the first component defining with the second component a cylindrical gap extending longitudinally along the axis, each of the components having one channel for passage of a pressurized fluid therethrough, said channels of the components communicating with one another across the gap; and sealing means for sealing said channels from leakage of pressurized fluid through the gap, said sealing means comprising two annular sealing elements, one of the components having two annular grooves axially spaced from each other and communicating with the gap, said one component having four sidewalls each pair of which define a part of one of the annular grooves, each sidewall of each pair being at least substantially parallel to the other sidewall of the pair, each pair of sidewalls including an axially remote sidewall bounding the gap, said one respective channel of each component being axially intermediate said two annular grooves, and said two sealing elements each being receivable with axial and radial play within a respective one of said grooves and in the gap, said sealing elements each being pressed against the axially remote sidewall in such a manner as to block the gap and thereby prevent leakage of pressurized fluid as pressurized fluid passes through said communicating channels.

2. The motor defined in claim 1, the one component surrounding the other component.

3. The motor defined in claim 1, the sidewalls of each pair being at least substantially straight and parallel to each other and being parallel to the sidewalls of the other pair.

4. The motor defined in claim 3, each annular groove having a rectangular cross-section, each groove being also defined by a third sidewall perpendicular to the pair of sidewalls and being at least substantially parallel to the longitudinal extent of the gap.

5. The motor defined in claim 1, said two sealing elements being elastic and being in sliding contact with at least one of said components.

6. The motor defined in claim 1, the gap having a width of at least 0.1 mm.

7. The motor defined in claim 1, said communicating channels being an inlet channel; each of the components also having a second channel serving as an outlet for the pressurized fluid, said second channel being axially spaced from the location of said annular grooves and said inlet channel intermediate said grooves, said second channels of the components communicating with one another across the gap, said second channel being axially bounded on one side by a respective one of said axially spaced annular grooves; said one component having a third annular groove bounding said second channel on the side of said second channel opposite the one side, said third groove being axially spaced from said two grooves and communicating with the gap; and further comprising a third sealing element receivable with axial and radial play within said third groove and in the gap.

8. The motor defined in claim 1, said sealing elements being O-rings.

9. The motor defined in claim 1, said sealing elements having a rectangular cross-section.

10. The motor defined in claim 1, the other component being formed in a region facing said annular groove with an annular depression for partly receiving said sealing element.

11. The motor defined in claim 10, said sealing elements being O-rings with a defined thickness, the other component having two annular depressions, each being formed in a region facing a respective one of said annular grooves, and said annular depressions having a depth amounting to up to one fourth of the thickness of a respective O-ring.

12. The motor defined in claim 1, said sealing elements being slotted.

13. The motor defined in claim 1, said sealing elements being slotted along a plane extending substantially radially of said sealing element.

14. The motor defined in claim 1, said sealing elements each including two annular sealing members of similar configurations which are angularly displaced relative to one another about their common axis and which are connected to each other.

15. The motor defined in claim 1, said sealing elements each including at least one slot extending substantially parallel to the outer periphery of said sealing element.

16. The motor defined in claim 1, wherein said sealing elements each including at least one slot which is inclined with respect to the outer periphery of said sealing element.

17. The motor defined in claim 1, wherein at least one of said components has a finely machined smooth surface which bounds the gap.

18. A motor driven by pressurized fluid, the motor comprising a motor housing defining a hollow interior and including at least one stationary part extending into the hollow interior so as to form an axis; an external rotor extending inside the hollow interior and being rotatably connected to the stationary part in such a manner as to be rotated when contacted with a stream of pressurized fluid; an air guide element having an outer portion connected to said motor housing and an inner portion extending axially from said outer portion into the hollow interior and surrounding the stationary part, said inner portion having an outer surface facing away from the stationary part and having an inlet channel and an outlet channel spaced from said inlet channel, each channel passing through the outer surface and through said air guide element in such a manner that said inlet channel is communicable with a source of pressurized fluid; an air guide drum inside said motor housing and having an inner surface surrounding said air guide element, said drum being connected to said external rotor for joint rotation therewith, about and relative to the stationary part of said motor housing, the outer surface of said inner portion of said air guide element being spaced from the inner surface of said drum by an interstice having a width of at least 0.1 mm, said drum having an inlet channel and an outlet channel spaced from the inlet channel, each of the channels extending through the inner surface and through said drum in such a manner as to be communicable with said external rotor, the inlet channel and outlet channel of said air guide element communicating respectively with the inlet channel and outlet channel of said drum by way of the interstice; and sealing means for separating the inlet channels from the outlet channels to thereby prevent substantial leakage of pressurized fluid passing therethrough, said sealing means comprising at least one annular sealing element having a predetermined thickness, one of said air guide element and said drum having an annular depression with a depth amounting to up to one fourth of the thickness of said sealing element, the annular depression being intermediate the inlet channels and the outlet channels, and the other of said air guide element and said drum having an annular groove aligned with the annular depression and communicating therewith by way of the interstice, the annular groove, the annular depression and the interstice together forming a hollow portion in which said sealing element is receivable with radial and axial play.

19. A motor as defined in claim 1 wherein a surface portion of one of said components abutting radially against the annular sealing element is finished by compacting to provide a smooth sealing contact with the latter.

20. A motor as defined in claim 1 wherein a surface portion of one of said components abutting radially against the annular sealing element is lubricated by molybdenum disulfide.

* * * * *